US012785218B1

(12) United States Patent
Erb et al.

(10) Patent No.: US 12,785,218 B1
(45) Date of Patent: Nov. 3, 2026

(54) BATTERY CONFIGURATIONS HAVING BALANCED CURRENT COLLECTORS

(71) Applicant: Stacked Energy, Inc., San Jose, CA (US)

(72) Inventors: Dylan Erb, San Jose, CA (US); Abraham B. Caulk, Livermore, CA (US); Ross L. Johnstal, Sunnyvale, CA (US); Paul W. Firehammer, West Olive, MI (US); Edward T. Hillstrom, Vancouver (CA); Zhongying Shi, Sunnyvale, CA (US); Isaac S. Harper, Campbell, CA (US)

(73) Assignee: Stacked Energy, Inc., San Jose, CA (US)

( * ) Notice: Subject to any disclaimer, the term of this patent is extended or adjusted under 35 U.S.C. 154(b) by 818 days.

(21) Appl. No.: 18/105,733

(22) Filed: Feb. 3, 2023

Related U.S. Application Data

(63) Continuation of application No. 17/014,768, filed on Sep. 8, 2020, now Pat. No. 11,600,891.

(51) Int. Cl.
*H01M 50/507* (2021.01)
*H01M 4/64* (2006.01)
(Continued)

(52) U.S. Cl.
CPC ........... *H01M 50/507* (2021.01); *H01M 4/64* (2013.01); *H01M 10/4207* (2013.01);
(Continued)

(58) Field of Classification Search
CPC .................................................. H01M 10/425
See application file for complete search history.

(56) References Cited

U.S. PATENT DOCUMENTS

| | | |
|---|---|---|
| 4,317,864 A | 3/1982 | Strasser |
| 4,374,186 A | 2/1983 | McCartney et al. |

(Continued)

FOREIGN PATENT DOCUMENTS

| | | |
|---|---|---|
| CN | 1620735 A | 5/2005 |
| CN | 101202355 A | 6/2008 |

(Continued)

OTHER PUBLICATIONS

China Patent Application No. 201880026199.1 , "Office Action", May 10, 2023, 20 pages.

(Continued)

*Primary Examiner* — Brian R Ohara
(74) *Attorney, Agent, or Firm* — Fenwick & West LLP

(57) ABSTRACT

Energy storage devices, battery cells, and batteries of the present technology may include a first circuit board characterized by a first surface and a second surface opposite the first surface. The second surface may include a conductive layer. The batteries may include a battery stack overlying the first circuit board and electrically coupled with the second surface of the first circuit board. The battery stack may include a plurality of battery cells. The batteries may include a second circuit board overlying the battery stack. The second circuit board may be characterized by a first surface and a second surface opposite the first surface. The second surface may include a conductive layer, and the battery stack may be electrically coupled with the second surface of the second circuit board. The batteries may include a power distribution block electrically coupled with the first and second circuit boards.

20 Claims, 7 Drawing Sheets

(51) Int. Cl.
*H01M 10/42* (2006.01)
*H01M 50/249* (2021.01)

(52) U.S. Cl.
CPC ....... *H01M 10/425* (2013.01); *H01M 50/249* (2021.01); *H01M 2010/4271* (2013.01)

(56) References Cited

U.S. PATENT DOCUMENTS

| | | | |
|---|---|---|---|
| 4,567,119 A | 1/1986 | Lim | |
| 5,162,172 A | 11/1992 | Kaun | |
| 5,254,415 A | 10/1993 | Williams et al. | |
| 5,367,431 A | 11/1994 | Kunishi et al. | |
| 6,004,698 A | 12/1999 | Richardson et al. | |
| 8,124,266 B2 | 2/2012 | Yamazaki | |
| 8,153,410 B2 | 4/2012 | Jaffe | |
| 8,357,469 B2 | 1/2013 | Shaffer, II et al. | |
| 8,663,833 B2 | 3/2014 | Hosaka et al. | |
| 9,142,811 B2 | 9/2015 | Chami | |
| 10,916,741 B1 | 2/2021 | Dafoe et al. | |
| 10,916,796 B1 | 2/2021 | Zeilinger et al. | |
| 10,923,728 B1 | 2/2021 | Zeng | |
| 11,018,343 B1 | 5/2021 | Dafoe et al. | |
| 11,043,703 B1 | 6/2021 | Zeng et al. | |
| 11,189,834 B1 | 11/2021 | Zeng | |
| 11,228,074 B2 | 1/2022 | Kaye et al. | |
| 11,296,351 B1 | 4/2022 | Gorer et al. | |
| 11,296,361 B2 | 4/2022 | Chu et al. | |
| 11,335,977 B1 | 5/2022 | Zeng et al. | |
| 11,588,155 B1 | 2/2023 | Erb et al. | |
| 11,600,891 B1 | 3/2023 | Erb et al. | |
| 11,677,120 B2 | 6/2023 | Erb et al. | |
| 11,699,815 B1 | 7/2023 | Zeng et al. | |
| 11,791,470 B2 | 10/2023 | Campbell et al. | |
| 11,862,801 B1 | 1/2024 | Zeng | |
| 11,888,112 B2 | 1/2024 | Kaye et al. | |
| 11,923,494 B2 | 3/2024 | Erb et al. | |
| 2002/0146620 A1 | 10/2002 | Connell | |
| 2003/0027051 A1 | 2/2003 | Kejha et al. | |
| 2003/0096170 A1 | 5/2003 | Fujiwara et al. | |
| 2003/0194605 A1 | 10/2003 | Fauteux et al. | |
| 2004/0001302 A1 | 1/2004 | Sato et al. | |
| 2005/0019643 A1 | 1/2005 | Sugita et al. | |
| 2005/0106456 A1 | 5/2005 | Puester et al. | |
| 2007/0210760 A1 | 9/2007 | Shimamura et al. | |
| 2009/0023059 A1 | 1/2009 | Kinoshita et al. | |
| 2009/0068531 A1 | 3/2009 | Sawa et al. | |
| 2009/0087728 A1 | 4/2009 | Less et al. | |
| 2009/0117456 A1 | 5/2009 | Hosaka et al. | |
| 2009/0136832 A1 | 5/2009 | Mitsuda et al. | |
| 2009/0233175 A1 | 9/2009 | Kelley et al. | |
| 2009/0297892 A1 | 12/2009 | Tjaz et al. | |
| 2010/0124693 A1 | 5/2010 | Kosugi et al. | |
| 2010/0134942 A1 | 6/2010 | Wang et al. | |
| 2010/0285355 A1 | 11/2010 | Kozinsky et al. | |
| 2011/0294007 A1 | 12/2011 | Hosaka et al. | |
| 2012/0129022 A1* | 5/2012 | Kalish | H01M 10/39 429/90 |
| 2012/0148913 A1 | 6/2012 | Chiba | |
| 2012/0156552 A1 | 6/2012 | Miyazaki et al. | |
| 2012/0189896 A1 | 7/2012 | Zhou et al. | |
| 2012/0219835 A1 | 8/2012 | Kawabe et al. | |
| 2012/0263995 A1 | 10/2012 | Naito et al. | |
| 2013/0065106 A1 | 3/2013 | Faust | |
| 2013/0089774 A1 | 4/2013 | Chami | |
| 2013/0242593 A1 | 9/2013 | LoRocco et al. | |
| 2013/0266823 A1 | 10/2013 | Lee | |
| 2014/0127542 A1 | 5/2014 | Li et al. | |
| 2014/0154542 A1 | 6/2014 | Issaev et al. | |
| 2014/0178753 A1 | 6/2014 | Chu et al. | |
| 2015/0037616 A1 | 2/2015 | Wyatt et al. | |
| 2015/0155564 A1 | 6/2015 | Chami et al. | |
| 2015/0228937 A1 | 8/2015 | Spilker | |
| 2015/0311490 A1 | 10/2015 | Murase et al. | |
| 2015/0325894 A1 | 11/2015 | Merriman et al. | |
| 2016/0049646 A1 | 2/2016 | Fujiki et al. | |
| 2016/0049679 A1 | 2/2016 | Stevens et al. | |
| 2016/0093845 A1 | 3/2016 | DeKeuster et al. | |
| 2016/0099456 A1 | 4/2016 | Kwon et al. | |
| 2016/0099490 A1 | 4/2016 | Larsson | |
| 2016/0111729 A1 | 4/2016 | Kim et al. | |
| 2016/0197352 A1 | 7/2016 | Blaser et al. | |
| 2016/0248113 A1 | 8/2016 | He et al. | |
| 2016/0329535 A1 | 11/2016 | Moomaw et al. | |
| 2016/0329606 A1 | 11/2016 | Ro et al. | |
| 2017/0012331 A1* | 1/2017 | Ng | H01M 10/0422 |
| 2017/0077545 A1 | 3/2017 | Shaffer, II et al. | |
| 2017/0133689 A1 | 5/2017 | Moore et al. | |
| 2017/0214057 A1 | 7/2017 | Kotik et al. | |
| 2018/0013144 A1 | 1/2018 | Li et al. | |
| 2018/0219227 A1 | 8/2018 | Moomaw et al. | |
| 2018/0226654 A1 | 8/2018 | Ohsawa et al. | |
| 2018/0316063 A1 | 11/2018 | Masel et al. | |
| 2019/0036147 A1 | 1/2019 | Yuan et al. | |
| 2019/0237748 A1 | 8/2019 | Shin et al. | |
| 2020/0028166 A1 | 1/2020 | Tanaka et al. | |
| 2020/0395594 A1 | 12/2020 | Doi et al. | |
| 2022/0111758 A1 | 4/2022 | Ijaz et al. | |
| 2022/0111759 A1 | 4/2022 | Ijaz | |
| 2022/0115897 A1 | 4/2022 | Ijaz | |
| 2023/0026549 A1 | 1/2023 | Ijaz et al. | |

FOREIGN PATENT DOCUMENTS

| | | | |
|---|---|---|---|
| CN | 101809801 | A | 8/2010 |
| CN | 101884125 | A | 11/2010 |
| CN | 102005566 | A | 4/2011 |
| CN | 102187504 | A | 9/2011 |
| CN | 102272977 | A | 12/2011 |
| CN | 102341948 | A | 2/2012 |
| CN | 102576850 | A | 7/2012 |
| CN | 103069614 | A | 4/2013 |
| CN | 103165920 | A | 6/2013 |
| CN | 103222098 | A | 7/2013 |
| CN | 103548196 | A | 1/2014 |
| CN | 103855360 | A | 6/2014 |
| CN | 103904294 | A | 7/2014 |
| CN | 104466191 | A | 3/2015 |
| CN | 104604003 | A | 5/2015 |
| EP | 1125336 | A1 | 8/2001 |
| EP | 1156547 | A1 | 11/2001 |
| EP | 2892097 | A1 | 7/2015 |
| EP | 3196955 | A1 | 7/2017 |
| EP | 3435473 | A1 | 1/2019 |
| JP | 06503442 | A | 4/1994 |
| JP | 07161346 | A | 6/1995 |
| JP | 2001357854 | A | 12/2001 |
| JP | 2002343452 | A | 11/2002 |
| JP | 2003096219 | A | 4/2003 |
| JP | 2005005163 | A | 1/2005 |
| JP | 2006012556 | A | 1/2006 |
| JP | 2007012584 | A | 1/2007 |
| JP | 2009224097 | A | 10/2009 |
| JP | 2011009203 | A | 1/2011 |
| JP | 2011071011 | A | 4/2011 |
| JP | 4857710 | B2 | 1/2012 |
| JP | 2012234823 | A | 11/2012 |
| JP | 2013114746 | A | 6/2013 |
| JP | 2013187074 | A | 9/2013 |
| JP | 5410822 | B2 | 2/2014 |
| JP | 2014029818 | A | 2/2014 |
| JP | 2018083957 | A | 5/2018 |
| KR | 20130066795 | A | 6/2013 |
| WO | 8504287 | A1 | 9/1985 |
| WO | 9210861 | A1 | 6/1992 |
| WO | 2010111087 | A1 | 9/2010 |
| WO | 2016031689 | A1 | 3/2016 |
| WO | 2017007827 | A1 | 1/2017 |
| WO | 2018057566 | A1 | 3/2018 |
| WO | 2018195372 | A1 | 10/2018 |
| WO | 2018213601 | A2 | 11/2018 |
| WO | 2019059133 | A1 | 3/2019 |

(56) References Cited

FOREIGN PATENT DOCUMENTS

| | | | |
|---|---|---|---|
| WO | 2019184311 | A1 | 10/2019 |
| WO | 2021048028 | A1 | 3/2021 |

OTHER PUBLICATIONS

Thaler , et al., "Automotive Battery Technology", Beijing Institute of Technology Press, Feb. 28, 2017, 5 pages.
International Patent Application No. PCT/US2021/049023, International Preliminary Report on Patentability, Mar. 23, 2023, 8 pages.
U.S. Appl. No. 15/742,009 , Final Office Action, Mailed on Aug. 19, 2020, 13 pages.
U.S. Appl. No. 15/742,009 , Non-Final Office Action, Mailed on Nov. 30, 2020, 13 pages.
U.S. Appl. No. 15/742,009 , Non-Final Office Action, Mailed on Nov. 15, 2019, 14 pages.
U.S. Appl. No. 15/742,009 , Non-Final Office Action, Mailed on Aug. 3, 2021, 16 pages.
U.S. Appl. No. 15/742,009 , Notice of Allowance, Mailed on Dec. 24, 2021, 12 pages.
U.S. Appl. No. 15/742,009 , "Restriction Requirement", Jun. 11, 2019, 8 pages.
U.S. Appl. No. 15/962,133 , Final Office Action, Mailed on Jul. 7, 2020, 5 pages.
U.S. Appl. No. 15/962,133 , Non-Final Office Action, Mailed on Jan. 21, 2020, 10 pages.
U.S. Appl. No. 15/962,133 , Notice of Allowance, Mailed on Feb. 9, 2021, 8 pages.
U.S. Appl. No. 16/007,534 , Non-Final Office Action, Mailed on May 5, 2020, 11 pages.
U.S. Appl. No. 16/007,534 , Notice of Allowance, Mailed on Nov. 18, 2020, 8 pages.
U.S. Appl. No. 16/038,865 , Final Office Action, Mailed on Jun. 1, 2021, 7 pages.
U.S. Appl. No. 16/038,865 , Non-Final Office Action, Mailed on Nov. 6, 2020, 13 pages.
U.S. Appl. No. 16/038,865 , Notice of Allowance, Mailed on Aug. 13, 2021, 8 pages.
U.S. Appl. No. 16/049,250 , Non-Final Office Action, Mailed on Apr. 8, 2020, 8 pages.
U.S. Appl. No. 16/049,250 , Notice of Allowance, Mailed on Oct. 7, 2020, 7 pages.
U.S. Appl. No. 16/108,498 , Final Office Action, Mailed on Dec. 9, 2020, 25 pages.
U.S. Appl. No. 16/108,498 , Non-Final Office Action, Mailed on May 17, 2021, 21 pages.
U.S. Appl. No. 16/108,498 , Non-Final Office Action, Mailed on Apr. 30, 2020, 9 pages.
U.S. Appl. No. 16/108,498 , Notice of Allowance, Mailed on Feb. 24, 2022, 11 pages.
U.S. Appl. No. 16/108,503 , Final Office Action, Mailed on Oct. 12, 2022, 8 pages.
U.S. Appl. No. 16/108,503 , Final Office Action, Mailed on May 25, 2021, 9 pages.
U.S. Appl. No. 16/108,503 , Non-Final Office Action, Mailed on Oct. 2, 2020, 11 pages.
U.S. Appl. No. 16/108,503 , Non-Final Office Action, Mailed on Feb. 2, 2022, 9 pages.
U.S. Appl. No. 16/108,522 , Non-Final Office Action, Mailed on Sep. 9, 2020, 10 pages.
U.S. Appl. No. 16/108,522 , Notice of Allowance, Mailed on Feb. 26, 2021, 8 pages.
U.S. Appl. No. 16/263,890 , Non-Final Office Action, Mailed on Jun. 16, 2020, 9 pages.
U.S. Appl. No. 16/263,890 , Notice of Allowance, Mailed on Oct. 23, 2020, 8 pages.
U.S. Appl. No. 16/273,625 , Final Office Action, Mailed on Feb. 16, 2021, 14 pages.
U.S. Appl. No. 16/273,625 , Non-Final Office Action, Mailed on May 4, 2020, 14 pages.
U.S. Appl. No. 16/273,625 , Non-Final Office Action, Mailed on Dec. 24, 2021, 16 pages.
U.S. Appl. No. 16/273,625 , Notice of Allowance, Mailed on Sep. 1, 2022, 12 pages.
U.S. Appl. No. 16/522,475 , Non-Final Office Action, Mailed on May 17, 2021, 17 pages.
U.S. Appl. No. 16/613,094 , Non Final Office Action, Mailed on Aug. 19, 2022, 16 Pages.
U.S. Appl. No. 16/658,442 , Final Office Action, Mailed on Aug. 16, 2022, 15 pages.
U.S. Appl. No. 16/658,442 , Non-Final Office Action, Mailed on Feb. 22, 2022, 16 pages.
U.S. Appl. No. 16/683,088 , Final Office Action, Mailed on Oct. 12, 2021, 12 pages.
U.S. Appl. No. 16/683,088 , Non-Final Office Action, Mailed on Sep. 2, 2021, 10 pages.
U.S. Appl. No. 16/683,088 , Notice of Allowance, Mailed on Nov. 22, 2021, 8 pages.
U.S. Appl. No. 16/683,091 , Non-Final Office Action, Mailed on Aug. 18, 2021, 22 pages.
U.S. Appl. No. 17/014,550 , Notice of Allowance, Mailed on Oct. 18, 2022, 10 pages.
U.S. Appl. No. 17/014,637 , Non-Final Office Action, Mailed on Feb. 24, 2022, 20 pages.
U.S. Appl. No. 17/014,637 , Non-Final Office Action, Mailed on Jul. 25, 2022, 20 pages.
U.S. Appl. No. 17/014,717 , Non-Final Office Action, Mailed on Oct. 13, 2022, 14 pages.
U.S. Appl. No. 17/014,768 , Non-Final Office Action, Mailed on Jun. 30, 2022, 10 pages.
U.S. Appl. No. 17/014,768 , Notice of Allowance, Mailed on Nov. 4, 2022, 7 pages.
U.S. Appl. No. 17/353,059 , Non-Final Office Action, Mailed on Nov. 1, 2022, 8 pages.
Boeva et al., "Soluble and Highly lonically Conducting Interpolyelectrolyte Complexes Prepared via Chemical Template Polymerization of Aniline in the Presence of Perfluorinated Polysulfonic Acid," The Royal Society of Chemistry, vol. 4, No. 100, Oct. 31, 2014, pp. 56677-56681.
China Patent Application No. 201680039891.9 , Office Action, Mailed on Jun. 10, 2020, 18 pages.
China Patent Application No. 201680039891.9 , Office Action, Mailed on Jan. 6, 2020, 23 pages.
China Patent Application No. 201680039891.9 , Office Action, Mailed on Oct. 27, 2020, 8 pages.
China Patent Application No. 201780053071.X , Office Action, Mailed on Mar. 18, 2022, 15 pages.
China Patent Application No. 201780053071.X , Office Action, Mailed on Nov. 2, 2021, 20 pages.
China Patent Application No. 201780053071.X , Office Action, Mailed on Apr. 16, 2021, 21 pages.
China Patent Application No. 201780053071.X , Office Action, Mailed on Aug. 30, 2022, 29 pages.
China Patent Application No. 201880026199.1 , Office Action, Mailed on Mar. 3, 2022, 8 pages.
China Patent Application No. 202011204662.2 , Office Action, Mailed on Aug. 26, 2022, 14 pages.
China Patent Application No. 202011211648.5 , Office Action, Mailed on Aug. 19, 2022, 12 pages.
European Patent Application No. 16738994.9 , Notice of Decision to Grant, Mailed on Sep. 24, 2020, 2 pages.
European Patent Application No. 16738994.9 , Office Action, Mailed on Mar. 23, 2018, 3 pages.
Japan Patent Application No. 2018-500449 , Office Action, Mailed on Jan. 21, 2019, 11 pages.
Korea Patent Application No. 10-2018-7000263 , Office Action, Mailed on Sep. 27, 2019, 16 pages.
Korea Patent Application No. 10-2018-7000263 , Office Action, Mailed on Feb. 28, 2019, 5 pages.

(56) References Cited

OTHER PUBLICATIONS

International Patent Application No. PCT/US2016/041151 , International Preliminary Report on Patentability, Mailed on Jan. 18, 2018, 8 pages.
International Patent Application No. PCT/US2017/052413 , International Preliminary Report on Patentability, Mailed on Apr. 4, 2019, 12 pages.
International Patent Application No. PCT/US2017/052413 , International Search Report and Written Opinion, Mailed on Feb. 1, 2018, 19 pages.
International Patent Application No. PCT/US2017/052413 , "Invitation to Pay Additional Fees and, Where Applicable, Protest Fee", Dec. 8, 2017, 11 pages.
International Patent Application No. PCT/US2018/028472 , International Preliminary Report on Patentability, Mailed on Oct. 31, 2019, 10 pages.
International Patent Application No. PCT/US2018/028472 , International Search Report and Written Opinion, Mailed on Jul. 27, 2018, 13 pages.
International Patent Application No. PCT/US2018/033218 , International Preliminary Report on Patentability, Mailed on Nov. 28, 2019, 9 pages.
International Patent Application No. PCT/US2018/033218 , International Search Report and Written Opinion, Mailed on Nov. 16, 2018, 13 pages.
International Patent Application No. PCT/US2020/060348 , International Preliminary Report on Patentability, Mailed on May 27, 2022, 8 pages.
International Patent Application No. PCT/US2020/060348 , International Search Report and Written Opinion, Mailed on Mar. 12, 2021, 9 pages.
International Patent Application No. PCT/US2020/060350 , International Preliminary Report on Patentability, Mailed on May 27, 2022, 8 pages.
International Patent Application No. PCT/US2020/060350 , International Search Report and Written Opinion, Mailed on Mar. 12, 2021, 12 pages.
International Patent Application No. PCT/US2021/049023 , International Search Report and Written Opinion, Mailed on Dec. 22, 2021, 11 pages.
Thuc et al., "Study on Synthesis and Characterization of Anion Exchange Membrane Based on Poly (Vinyl Alcohol) Modified by Free-Radical Polymerization," International Journal of Electrochemical Science, vol. 15, Jul. 10, 2020, pp. 8190-8199.
Weng et al., "Three-Electrolyte Electrochemical Energy Storage Systems Using Both Anion- and Cation-Exchange Membranes as Separators," Energy, vol. 167, Jan. 15, 2019, pp. 1-32.
Machine Translation of JP 2001357854 A, Dec. 26, 2001, 18 pages.
U.S. Appl. No. 18/054,800, Non-Final Office Action, Jul. 5, 2024, 8 pages.
China Patent Application No. 201880026199.1, Office Action, Apr. 30, 2024, 22 pages.
International Patent Application No. PCT/US2016/041151, International Search Report and Written Opinion, Mailed On Aug. 25, 2016, 10 pages.

* cited by examiner

BATTERY CONFIGURATIONS HAVING BALANCED CURRENT COLLECTORS

CROSS-REFERENCE TO RELATED APPLICATION

The present application is a continuation of, and claims the benefit of, U.S. patent application Ser. No. 17/014,768, filed on Sep. 8, 2020. The disclosure of which is herein incorporated by reference in its entirety for all purposes

TECHNICAL FIELD

The present technology relates to batteries and battery components. More specifically, the present technology relates to battery configurations utilizing current collectors with balanced current distributions.

BACKGROUND

In batteries and battery cells, configurations are often limited by the shape of the cell itself. This may impact packaging, current distribution, and a host of other related aspects. Improved designs and processes are needed.

SUMMARY

The present technology relates to energy storage devices, including battery cells and batteries, which may include lithium-ion batteries having a variety of shapes including stacked cells, and which may be or include bipolar batteries as well as batteries stacked in any orientation including vertical and horizontal, for example. These devices may include current collectors configured based on a z-direction transmission of current through the collectors and cell components, although current collectors configured based on an xy-directional transmission of current may also benefit from the present designs. The batteries and cells may include a host of features and material configurations as will be described throughout the present disclosure.

Energy storage devices, battery cells, and batteries of the present technology may include a first circuit board characterized by a first surface and a second surface opposite the first surface. The second surface may include a conductive layer. The batteries may include a battery stack overlying the first circuit board and electrically coupled with the second surface of the first circuit board. The battery stack may include a plurality of battery cells. The batteries may include a second circuit board overlying the battery stack. The second circuit board may be characterized by a first surface and a second surface opposite the first surface. The second surface may include a conductive layer, and the battery stack may be electrically coupled with the second surface of the second circuit board. The batteries may include a power distribution block electrically coupled with the first surface of the first circuit board along a first edge of the first circuit board. The power distribution block also may be electrically coupled with the first surface of the second circuit board along a first edge of the first circuit board.

In some embodiments, the first circuit board may be characterized by a second edge extending orthogonally to the first edge. The second edge may be plated with a conductive material extending about the second edge and coupling the second surface of the first circuit board with the first surface of the first circuit board. The first circuit board may be characterized by a second edge extending orthogonally to the first edge. A plurality of conductive vias may be defined through the second edge of the first circuit board and may electrically couple the second surface of the first circuit board with the first surface of the first circuit board. The plurality of conductive vias may be distributed equidistantly along the second edge of the first circuit board. A plurality of conductive traces may be formed along the first surface of the first circuit board extending from the first edge of the first circuit board to the second edge of the first circuit board to electrically couple with the plurality of conductive vias through the first circuit board. The first edge of the first circuit board may be characterized by a proximal end at which the second edge intersects the first edge. A first conductive trace formed adjacent the proximal end may be characterized by a first impedance. A second conductive trace adjacent a distal end of the first edge of the first circuit board may be characterized by a second impedance less than the first conductive trace.

The second conductive trace may be characterized by a greater width than the first conductive trace. Each successive trace of the plurality of traces positioned along the first edge of the first circuit board from the distal end of the first edge of the first circuit board to the proximal end of the first edge of the first circuit board may be characterized by an increasing impedance relative to a preceding trace. Each successive trace of the plurality of traces positioned along the first edge of the first circuit board from the distal end of the first edge of the first circuit board to the proximal end of the first edge of the first circuit board may be characterized by a decreasing trace length relative to a preceding trace. The second circuit board may be characterized by a second edge extending orthogonally to the first edge of the second circuit board from a proximal end of the first edge of the second circuit board. The second edge of the second circuit board may be vertically aligned with the second edge of the first circuit board. The second circuit board may be characterized by a third edge opposite the second edge and extending from a distal end of the first edge of the second circuit board. A plurality of conductive vias may be defined through the third edge of the second circuit board and electrically couple the second surface of the second circuit board with the first surface of the second circuit board. A plurality of conductive traces may be formed along the first surface of the second circuit board extending from the first edge of the second circuit board to the third edge of the second circuit board to electrically couple with the plurality of conductive vias through the second circuit board. A first conductive trace formed adjacent the proximal end of the first edge of the second circuit board may be characterized by a first impedance, and wherein a second conductive trace adjacent a distal end of the first edge of the second circuit board is characterized by a second impedance greater than the first conductive trace.

Some embodiments of the present technology may encompass batteries. The batteries may include a first circuit board characterized by a first surface and a second surface opposite the first surface. The second surface may include a conductive layer. The batteries may include a battery stack overlying the first circuit board and electrically coupled with the second surface of the first circuit board. The battery stack may include a plurality of battery cells. The battery stack may define a plurality of apertures through an active region of the battery stack. The batteries ma include a second circuit board overlying the battery stack. The second circuit board may be characterized by a first surface and a second surface opposite the first surface. The second surface may include a conductive layer. The battery stack may be electrically coupled with the second surface of the second circuit board.

The batteries may include a power distribution block electrically coupled with the first surface of the first circuit board along a first edge of the first circuit board. The power distribution block may also be electrically coupled with the first surface of the second circuit board along a first edge of the first circuit board. The batteries may include a plurality of retaining members coupling the second circuit board with the first circuit board. Each retaining member of the plurality of retaining members may extend through a separate aperture of the plurality of apertures through the active region of the battery stack.

In some embodiments the batteries may include a plurality of busbars extending laterally across the first surface of the first circuit board. Each busbar may be coupled with at least two retaining members of the plurality of retaining members. A first set of busbars of the plurality of busbars may be electrically coupled with the second surface of the first circuit board via a first set of retaining members of the plurality of retaining members. Each retaining member of the first set of retaining members of the plurality of retaining members may include a conductive coupler extending through the first circuit board and electrically coupling the first set of busbars of the plurality of busbars with the second surface of the first circuit board. A second set of busbars of the plurality of busbars may be electrically coupled with the second surface of the second circuit board via a second set of retaining members of the plurality of retaining members. Each retaining member of the second set of retaining members of the plurality of retaining members may include a conductive coupler extending through the first circuit board and the battery stack and electrically coupling the second set of busbars of the plurality of busbars with the second surface of the second circuit board. A recess may be formed within the active region of the battery stack through one or more battery cells of the battery stack. The batteries may include electrical components disposed within the recess formed within the active region of the battery stack. The plurality of busbars may be connected through the first circuit board with the electrical components seated within the recess formed within the active region of the battery stack.

Such technology may provide numerous benefits over conventional technology. For example, the present devices may provide improved current distributions across current collectors. Additionally, batteries according to some embodiments of the present technology may facilitate cut out regions for components or devices. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
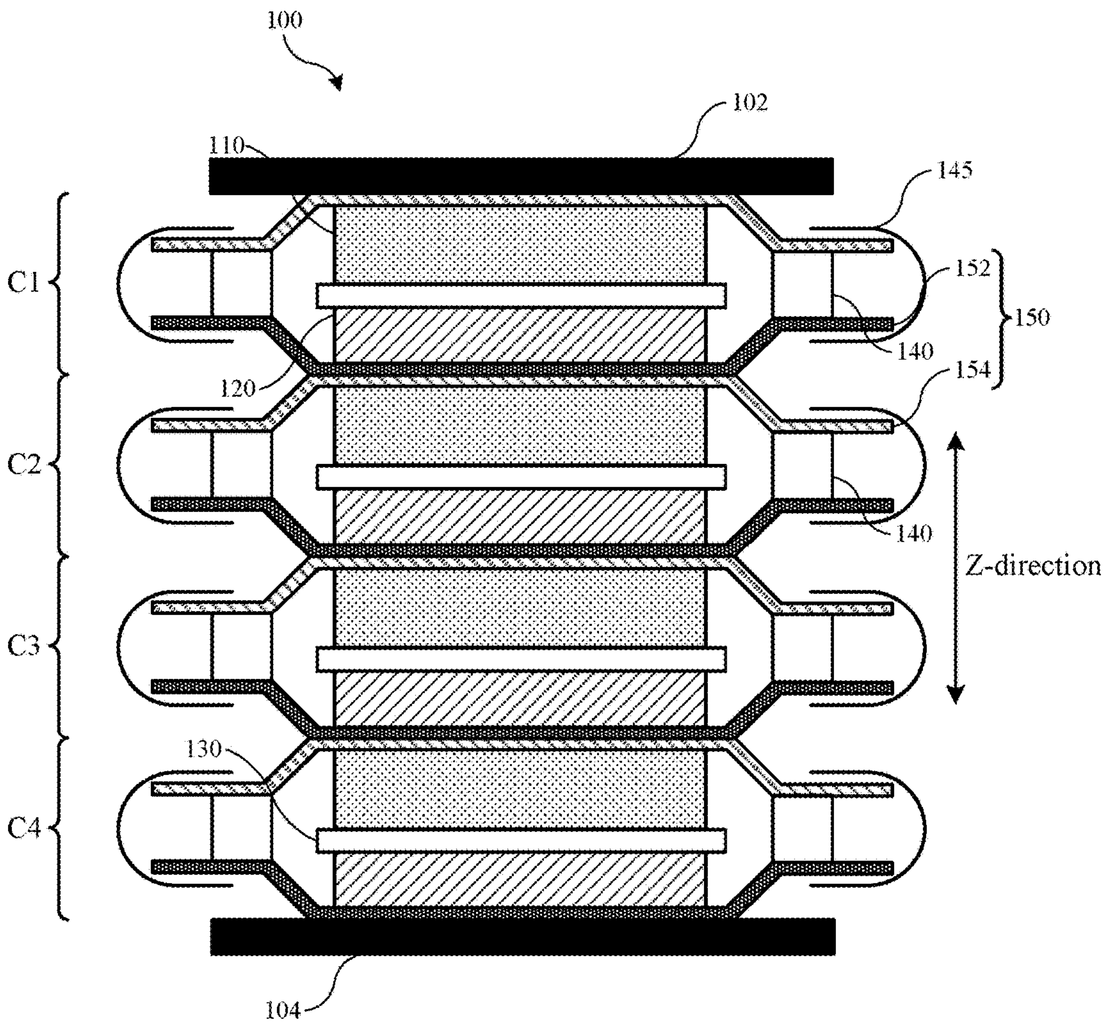
FIG. 1 shows a schematic cross-sectional view of an energy storage device according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be grouped in packs, where a battery may include multiple battery cells coupled together to provide a desired voltage or capacity. When batteries are connected in this way, they are often charged and discharged together. When battery cells are characterized by extended dimensions, uniform transmission of current may be challenged. For example, while current flow may occur across locations close to cell terminals, current flow at central regions may not as readily occur.

The present technology overcomes these issues by utilizing pack boards that may better deliver current across current collectors, and through the battery stack, to provide more uniform delivery through each battery cell. Additionally, by utilizing battery cells according to some embodiments of the present technology, electrical components may be disposed within recesses of the battery stack, which may reduce an overall footprint of the battery.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed but can be utilized broadly with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries, where current is delivered laterally across a current collector to a tab, which may be accessed to deliver current from the cell.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical or battery cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. For example, batteries according to some embodiments of the present technology may include greater than or about 5 battery cells, and may include greater than or about 10, greater than or about 20, greater than or about 50, greater than or about 100, greater than or about 200, greater than or about 500, or more individual cells in a battery. The cells C may be positioned adjacent, e.g., abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances, the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
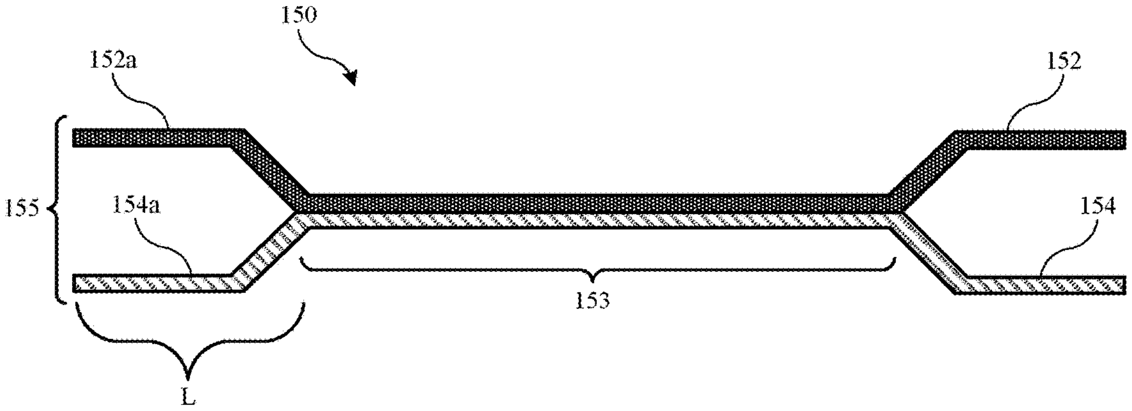
FIG. 2 shows a schematic cross-sectional view of a current collector according to some embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically conductive. In some embodiments, the first current collector and second current collector may be directly connected, while in other embodiments the first current collector and second current collector may be indirectly connected via a conductive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152*a* and 154*a* may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1\times10^{-4}$ ohm-m in embodiments. Additionally, exemplary current collectors may have an in-plane and through-plane resistivity of between about $1\times10^{-3}$ ohm-m and about 1,000 ohm-m. In other embodiments, more conventional electrical distribution may be employed, where current is transferred along conductive current collectors into and out of the cell.

Figure 3:
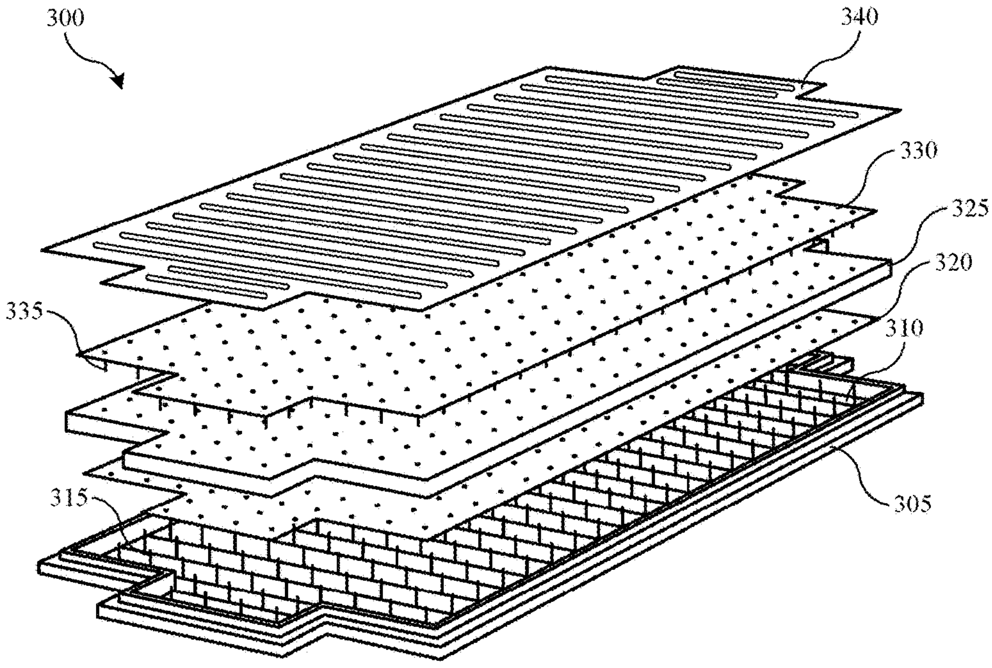
FIG. 3 shows a schematic exploded view of a battery according to some embodiments of the present technology.

Turning to FIG. 3 is shown a schematic exploded view of a battery 300 according to some embodiments of the present technology. Battery 300 may be or include any of the components, features, or characteristics of any of the battery cells previously described and may illustrate additional details of the components described above, as may be incorporated within a battery. The view illustrated may show one possible formation of a battery pack encompassed by the present technology, although any other geometry may also be produced. Although battery cells may be characterized by any dimensions according to embodiments of the present technology, in some embodiments the battery cells may be characterized by greater length and width dimensions relative to a thickness of the battery cell. For example, in some embodiments, battery cells may be characterized by a length and/or width of greater than or about 100 mm, and may be characterized by a length and/or width of greater than or about 200 mm, greater than or about 500 mm, greater than or about 1.0 m, greater than or about 1.5 m, greater than or about 2.0 m, greater than or about 3.0 m, or more. Additionally, in some embodiments, battery cells may be characterized by a thickness of less than or about 10 mm, and may be characterized by a thickness of less than or about 5 mm, less than or about 3 mm, less than or about 2 mm, less than or about 1 mm, less than or about 0.5 mm, less than or about 0.25 mm, less than or about 0.1 mm, or less. Accordingly, in some embodiments the length and/or width dimension may be several orders of magnitude greater than the battery cell thickness.

Additionally, current collectors may be or include materials characterized by higher resistivity, which may provide an in-plane resistivity that is many orders of magnitude higher than the through-cell resistivity, and which may be many orders of magnitude higher than conventional current collector materials, such as metals. As explained above, this may allow a z-directional transmission of current through the constituent battery cells, while limiting or controlling the lateral transmission of current. However, as discussed previously, this may cause challenges for uniform current delivery across the battery pack. To overcome these potential issues, in embodiments of the present technology, control boards or end plates according to some embodiments of the present technology may include layouts that control current delivery from a central distribution block to improve uniformity of delivery through the battery stack.

As shown in the figure, battery 300 may include a housing 305 or enclosure, which may form an internal volume for incorporating aspects of the battery. Seated within the housing may be a base plate 310, which may include a number of fasteners 315 or retaining members extending up from the base plate. A first circuit board 320 may be included overlying the base plate 310. The circuit board 320 may define a number of apertures through which each of the fasteners 315 may extend. A battery stack 325 may be disposed overlying the first circuit board 320. The battery stack 325 may be electrically coupled with the first circuit board, which may be operated at a first electrical potential. The battery stack 325 may include a number of battery cells, which may include any aspects of the battery cells as described above in some embodiments, including polymeric current collectors, and a configuration to deliver current vertically or through the current collectors to the next cell, as opposed to laterally, such as via conductive tabs coupled together in many conventional batteries.

The battery stack 325 may also define one or more apertures, including a plurality of apertures across the stack. As illustrated, the apertures may extend through the active regions of the battery stack, which may include sealed apertures, for example, through each battery cell to prevent shorting through the cell. A second circuit board 330 may be disposed overlying the battery stack 325, and the battery stack 325 may be electrically coupled with the circuit board, and operated at a second electrical potential, which may be the opposite potential at which the first circuit board may be operated. Current may be transferred vertically between the circuit boards, which may be similar to end plates as previously described. Accordingly, instead of joining a number of conductive tabs of each cell, current may be transferred from one cell to the next at all locations across the active area of the battery cells.

Second circuit board 330 may define a plurality of apertures through which the fasteners may extend. Shown extending from second circuit board 330 are housings 335 for fasteners 315, which may optionally be included in some embodiments as described below. A lid 340 may be disposed overlying the second circuit board 330. In some embodiments lid 340 may include both a compression plate and a lid as may be described further below, and in some embodiments the second circuit board may operate as a compression plate, again as further described below. Lid 340 may be coupled, such as bolted, bonded, welded, or otherwise coupled in any number of ways with housing 305 about a perimeter of the two components. Fasteners 315 may extend from base plate 310 through lid 340 in some embodiments, which may compressibly couple the compression plate, second circuit board, and/or lid with the base plate. Accordingly, in some embodiments, each of the circuit boards, and any base plate or compression plate, as well as the battery stack, and/or lid may include axially aligned apertures, which may produce channels through which the fasteners may extend. One or more aspects of the fastener may be conductive in some embodiments of the present technology, and thus in embodiments a seal may be formed in the active region of each battery cell of the battery stack about an aperture that partially defines the channel through the structure, at each location where an aperture may be formed.

Figure 4:
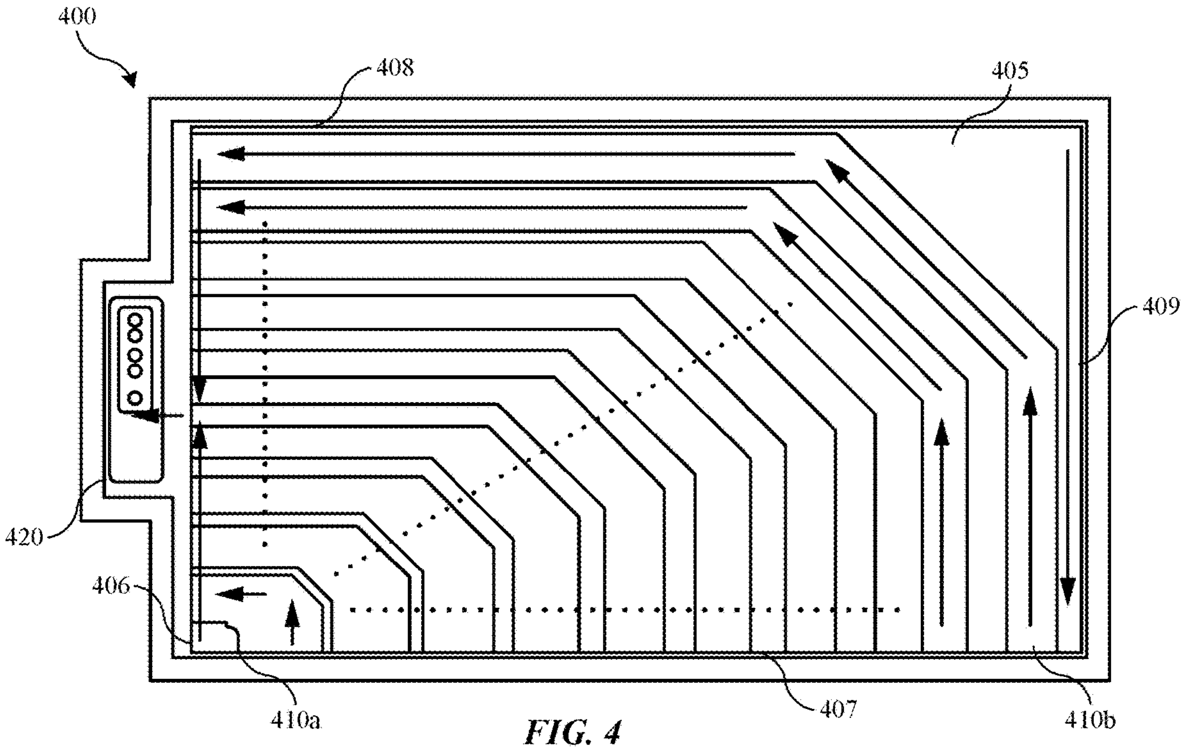
FIG. 4 shows a schematic top view of a battery according to some embodiments of the present technology.

FIG. 4 shows a schematic top view of a battery 400 according to some embodiments of the present technology. Battery 400 may include any aspect, characteristic, or component of any of the batteries described above, and may illustrate a view of a first circuit board 405. Circuit board 405 may include any feature or characteristic of circuit boards illustrated above and may illustrate a circuit board assembly. The view illustrated may show a first surface of circuit board 405, where a second surface opposite the first surface may be in contact, physically and/or electrically, with the battery stack as described above. Additionally illustrated is a power distribution block 420, which may be coupled with both first circuit board 405 as well as a second circuit board electrically coupled with an opposite side of a battery stack as illustrated above. First circuit board 405 and a second circuit board may be similar components, although in some embodiments the orientation may be adjusted in one or more ways as will be described further below.

First circuit board 405, as well as a second circuit board, may be characterized by a first edge 406, which may extend within an enclosure adjacent power distribution block 420. A busbar may extend along the first edge on the first surface of the circuit board 405, which may allow current to be distributed to or from the power distribution block 420. The power distribution block may be coupled with the first surface of the first circuit board as well as a first surface of the second circuit board. This may allow a controlled distribution of current as compared to across the second surface of each circuit board, which may include a conductive layer extending across the surface.

First circuit board 405, as well as a second circuit board, may be characterized by a second edge 407, which may extend orthogonally to the first edge. The second edge may extend from a proximal end of the first edge, while a third edge 408 opposite the second edge may extend from a distal end of the first edge. A fourth edge 409 may extend opposite and parallel to the first edge as illustrated. The first surface of the circuit boards may be characterized by a laminated structure, such as may be any type of printed circuit board, for example. Across the first surface of the circuit boards may be one or more, including a plurality, of conductive traces 410 formed along the first surface. The conductive traces 410 may extend from first edge 406 to second edge 407. Along first edge 406, the conductive traces may be electrically coupled with power distribution block 420, such as with a busbar or with other conductive coupling. Current may be delivered or received in the opposite operation of charging or discharging as illustrated, and the current may be spread across the first edge 406 of the circuit board. The current may then be distributed across the conductive traces, which may deliver the current to the second edge 407 of the circuit board. The current may then be transferred through the circuit board to the second surface, such as through a number of vias as will be described further below. Additionally, a more continuous edge plating or castellation may be formed along the second edge and may wrap around the second edge of the board electrically connecting the second surface with the first surface.

As discussed above, batteries according to some embodiments of the present technology may be characterized by larger lateral dimensions. This may affect current distribution across the battery. As current may distribute vertically through the battery stack based on high impedance current collectors, which may be characterized by high lateral impedance, uniformly distributing current across the lateral surface of the battery stack before vertical transmission may facilitate operation of the battery, and limit voltage or temperature fluctuation across the cells. To improve lateral distribution across the battery stack, the two circuit boards may be configured to have more uniform or balanced impedance across lengths of the circuit boards.

For example, as illustrated, the conductive traces 410 may run along a length and width of the circuit board. In some embodiments the traces may be extended about or insulated from the retraining members or fasteners extending through the battery. The trace widths, along with other features, may be modified to affect impedance along the individual traces. This may allow current to more uniformly reach the second surface 407 of the circuit board for transmission through the circuit board. By modifying the impedance along the trace, the varying lengths of the traces may be accommodated to provide a more equalized conductance across the circuit board traces.

For example, a first conductive trace 410*a* may be located as the nearest trace to the proximal end of first edge 406 where second edge 407 extends. Current delivered along this trace may have the shortest route across the surface of the circuit board. A second conductive trace 410*b* may be located as the furthest trace from the proximal end, such as adjacent the distal end of first edge 406 where third edge 408 extends from the first edge. As illustrated, the second trace may have a greater length across the length and width of the circuit board relative to the first conductive trace 410*a*. To coordinate delivery of current across both traces, and each intervening trace, the impedance of each trace may be adjusted. For example, by increasing the width or the amount of conductive material in a trace, impedance may be reduced, while by decreasing the width or the amount of conductive material in a trace, impedance may be increased. Hence, first conductive trace 410*a* may be characterized by a first impedance in some embodiments, and second conductive trace 410*b* may be characterized by a second impedance that is less than the impedance of the first conductive trace. When width is a factor in trace impedance, the traces may be characterized by successively increasing width, and the second conductive trace may be at least twice the width of the first conductive trace, and may be at least three times the width, at least four times the width, at least five times the width, or more.

Consequently, where each successive trace from the proximal end of first edge 406 to the distal end may be characterized by an increased trace length as illustrated, each successive trace in that direction along the first edge from the second edge 407 to the third edge 408 may be characterized by a lower impedance relative to the preceding trace. In the opposite direction from the distal end to the proximal end, each successive trace may be characterized by increased impedance relative to a preceding trace. The impedances may be adjusted to accommodate any lateral dimensions to be traversed by current being delivered, which may allow the current to reach either the first or second edge at a similar rate. This may produce a more uniform delivery of current through the battery, which may improve operation of the battery over time by limiting dead zones as well as hot spots within the battery stack. In reverse, current may be received along the second edge 407 of the circuit boards equally across the edge as will be explained below, and then delivered along the traces as illustrated by the arrows. Once current is received along first edge 406, the current may be distributed, either along a conductive run or busbar to an electrical coupling for power distribution block 420.

Figure 5:
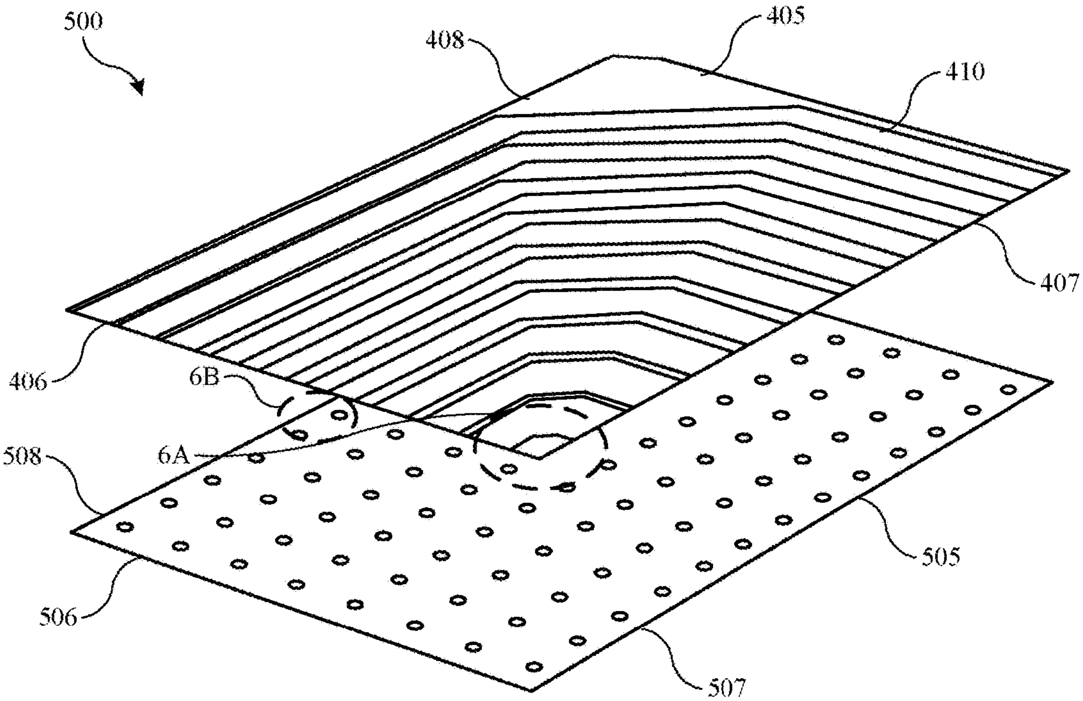
FIG. 5 shows a schematic isometric view of circuit boards according to some embodiments of the present technology.

FIG. 5 shows a schematic isometric view of a configuration 500 of circuit boards according to some embodiments of the present technology. The illustration may show with a battery stack disposed between the two circuit boards removed, but it is to be understood that the configuration 500 may be part of any battery as previously described and may include any of the components discussed above. For example, a battery stack may be disposed between the two circuit boards in contact with a second surface of each circuit board, and a number of fasteners may be extended between the components as noted above. Although terms such as first circuit board and second circuit board may be used, either circuit board may be a first or second circuit board in embodiments of the present technology as would be understood by the skilled artisan.

The circuit boards may include a first circuit board 405 as illustrated above as well as a second circuit board 505, which may be similar to circuit board 405, and may include any component, feature, or characteristic of the circuit board. In some embodiments, circuit board 505 may be identical to circuit board 405 but may be flipped about a longitudinal axis along the circuit board. Accordingly, traces may begin from the same edge of the circuit board but may extend to the opposite longitudinal edge of the circuit board. For example, as discussed above, first circuit board 405 may be characterized by a first surface, which can be seen in the illustration, and may be characterized by a first edge 406, a second edge 407, and a third edge 408. Second circuit board 505 may be characterized by a first surface similar to the first circuit board and may illustrate a second surface of the circuit board, which may be similar to a second surface of the first circuit board. The second surface may include a layer of conductive material, such as copper or aluminum, as well as any other conductive material, extending across the second surface of the circuit boards. As shown, the conductive material may be maintained a radial distance away from each aperture extending through the circuit board in some embodiments. The conductive material may quickly diffuse current received from the first surface of the circuit board across the second surface to provide a uniform coverage of electrical distribution.

To further facilitate distribution across the entire area of the battery stack, the circuit boards may deliver current between the first surface and second surface from opposite edges of the circuit board. For example, as illustrated, first circuit board 405 may include conductive traces 410 extending from first edge 406 to second edge 407. Second circuit board 505 may also be characterized by a first edge 506 from which a plurality of conductive traces may extend, and which may be coupled with a power distribution block as previously described. Second circuit board 505 may also be characterized by a second edge 507 extending orthogonally to the first edge 506 from a proximal end of the first edge 506. As shown, first edge 506 may be vertically aligned with first edge 406 of the first circuit board, and second edge 507 may be vertically aligned with the second edge 407 of the first circuit board. Second circuit board 505 may also be characterized by a third edge 508 opposite the second edge 507 and extending from a distal end of the first edge 506. Third edge 508 may be vertically aligned with third edge 408 of the first circuit board.

As noted above, second circuit board 505 may be a flipped orientation of the first circuit board 405, where third edge 508 of the second circuit board may be equivalent to second edge 407 of the first circuit board. Accordingly, conductive traces along the first surface of the second circuit board may extend from first edge 506 to third edge 508, such as if second edge 407 of the first circuit board were rotated about a longitudinal axis through the first circuit board to position the second edge where third edge 408 is located. This may allow the conductive traces to distribute current to opposite sides of the circuit boards along the first surfaces of the circuit boards. Consequently, the illustration of second circuit board 505 may illustrate a second surface of first circuit board 405 when flipped, and the illustration of first circuit board 405 may illustrate a first surface of the second circuit board 505 when flipped.

The first surface of the circuit boards may be electrically insulated from the second surface of the circuit boards across the circuit boards. However, conductive vias may electrically couple the two surfaces along an edge of the circuit board, such as where conductive traces extend from first surface 406 or first surface 506. Accordingly, a plurality of conductive vias may extend along and be defined through the second edge 407 of the first circuit board to electrically couple the second surface of the first circuit board with the first surface of the first circuit board. Similarly, a plurality of conductive vias may extend along and be defined through the third edge 408 of the second circuit board to electrically couple the second surface of the second circuit board with the first surface of the second circuit board. This may help improve current distribution so current distributed through the battery stack may not be more concentrated along one edge of the battery stack in some embodiments. Conductive traces 410 extending from first edge 406 to second edge 407 may electrically couple the power distribution block with the plurality of conductive vias through the first circuit board. Similarly, conductive traces extending from the first edge 506 to third edge 508 may electrically couple the power distribution block with the plurality of conductive vias through the second circuit board.

Figure 6A:
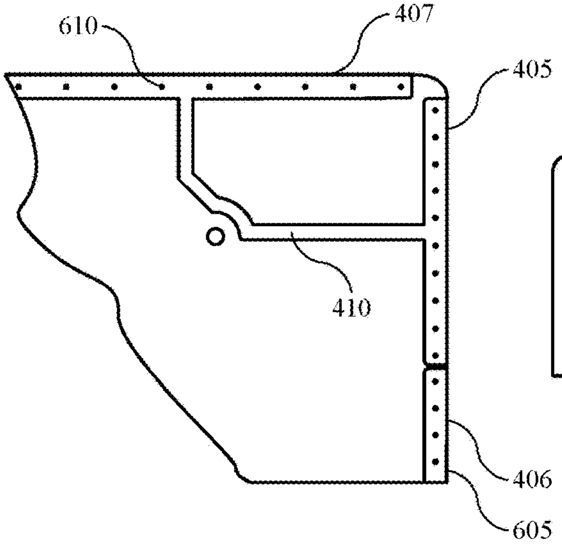
FIG. 6A shows a schematic illustration of vias and traces according to some embodiments of the present technology.

FIG. 6A shows a schematic illustration of vias and traces according to some embodiments of the present technology, such as in a detailed view of the identified portion of circuit board 405 discussed above. For example, the figure may show a proximal end of first edge 406 at the intersection of second edge 407. A first conductive trace 410 may be extended between the two edges as previously described. Along first edge 406 may be a conductive material or busbar 605 for distributing current from a power distribution block to the conductive traces. The traces may then distribute current uniformly to the second edge 407 as previously described. A plurality of conductive vias 610 may be distributed along the second edge 407 and may electrically couple the first surface of the circuit board with a second surface of the circuit board, which may then transfer current with the battery stack. The vias may be of any size and may be distributed in any way along the edge. In some embodiments the conductive vias may be distributed equidistantly along the second edge to more uniformly transfer current from the first surface to the second surface. As noted previously, the edge may also include a continuous edge plating extending along the second surface and wrapping around the board or coupling through the board, and electrically connecting the second surface with the first surface.

Figure 6B:
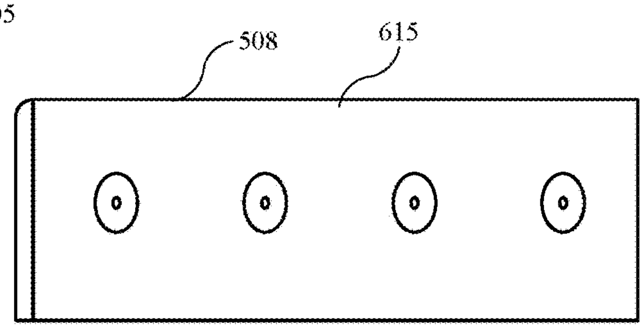
FIG. 6B shows a schematic illustration of vias according to some embodiments of the present technology.

FIG. 6B shows a schematic illustration of vias according to some embodiments of the present technology, such as in a detailed view of the identified portion of circuit board 505 discussed above. For example, the figure may show a region along a third edge 508, where a conductive material layer extends across the second surface of the circuit board. Along third edge 508 may be a plurality of conductive vias 615, which may be distributed along the third edge 508, and may electrically couple the first surface of the circuit board with a second surface of the circuit board, which may then transfer current within the battery stack. By aligning the conductive vias on opposite sides of the battery stack, improved current distribution may be afforded through the battery stack.

Figure 7:
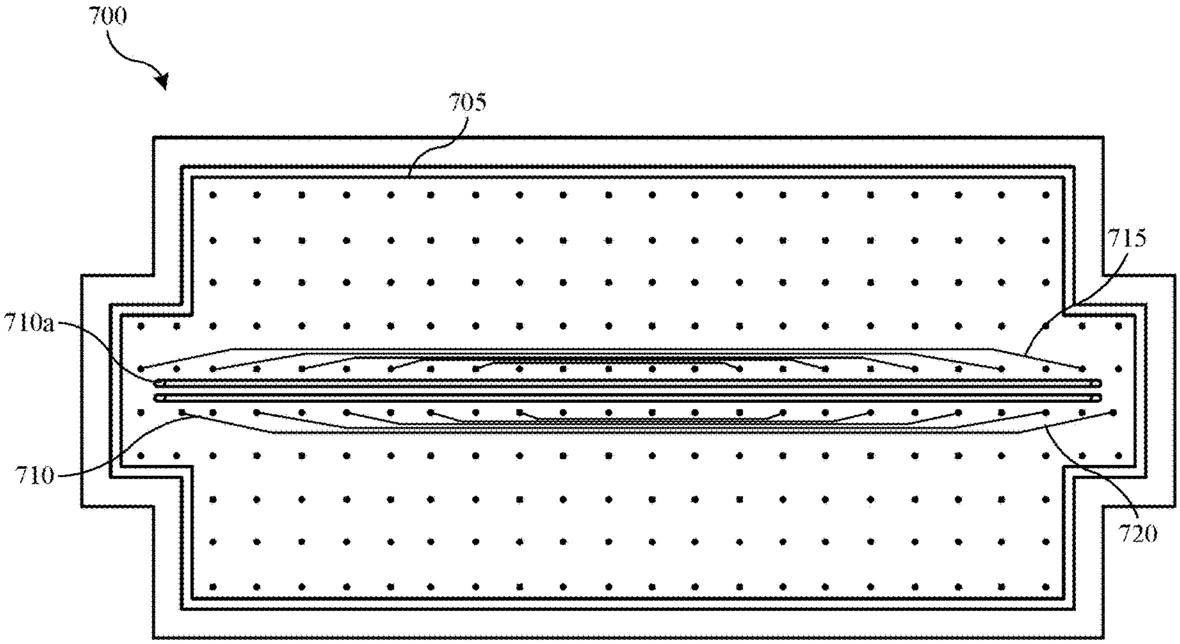
FIG. 7 shows a schematic top view of a battery according to some embodiments of the present technology.

The present technology may also encompass additional battery configurations having balanced electrical busing. Additionally, because battery cells according to the present technology may be formed to any number of shapes or geometries, the cells may also be configured to allow components to be recessed within the battery stack, reducing the overall footprint of the technology. FIG. 7 shows a schematic top view of a battery 700 including busbars according to some embodiments of the present technology. It is to be understood that battery 700 may include any aspect, component, characteristic, or feature of any battery discussed previously. The illustration may show an additional configuration for incorporating busbars along the battery to more uniformly draw and deliver current through the battery stack. The figure may illustrate a top view showing a circuit board 705, such as a first or second circuit board. The circuit board may include aspects as previously described, such as a conductive layer on a second surface of the circuit board, such as where the circuit board is coupled with a battery stack. It is to be understood that the battery 700 may include any of the other battery components discussed previously, including a compression plate or cover as previously described, as well as a power distribution block electrically coupled with the circuit boards as discussed above.

Across the first surface of the battery may be incorporated a plurality of busbars 710 extending laterally across the first surface of the circuit board. The busbars may include any number of busbars providing a number of connections with the battery to provide multiple electrical connection locations for drawing or delivering current to the battery. The busbars may be electrically coupled together and coupled with a power distribution block as discussed above, such as with one or more central bus elements 710*a*, which may deliver current across the battery. As shown, each busbar may be coupled with at least two retaining members extending through the battery pack as will be described further below. Any number of conductive couplers may be included for busing, and the number may be based on the size of the battery or layout, where longer areas may include additional connection positions to further increase uniformity of current delivery through the battery. The busbars may be included in groups or sets as illustrated, where a first set 715 may be used to electrically couple with the second surface of the first circuit board, and a second set 720 may be used to electrically couple with the second surface of the second circuit board. As will be described further below, in some embodiments the connections may be made through the fasteners or retaining members through the battery.

Figure 8:
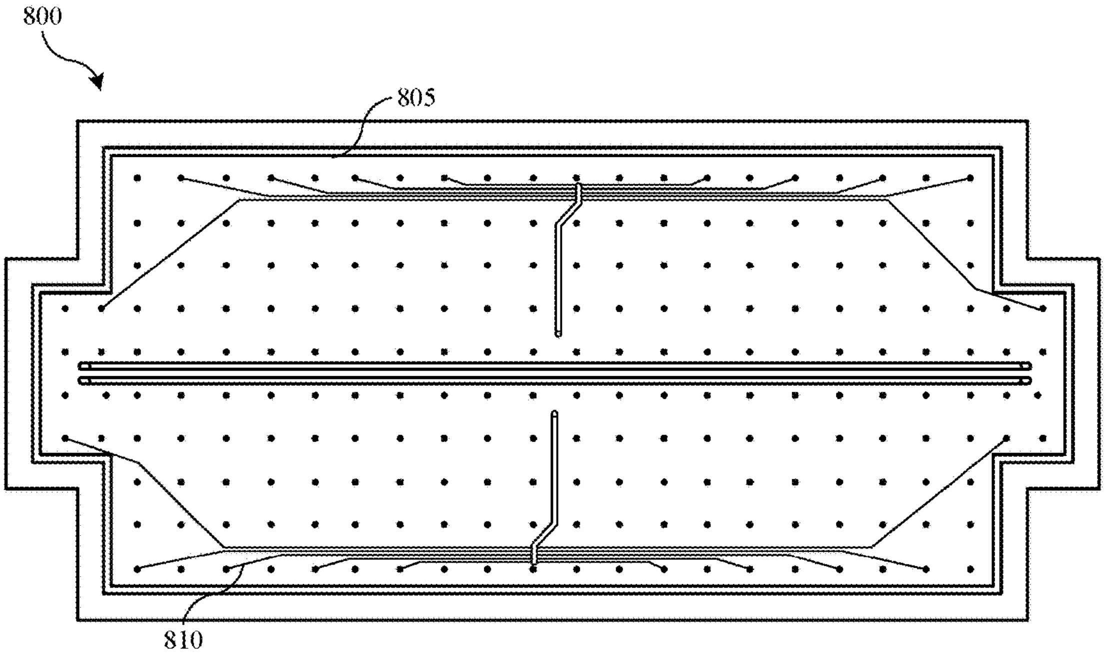
FIG. 8 shows a schematic top view of a battery according to some embodiments of the present technology.

FIG. 8 shows a schematic top view of a battery 800 according to some embodiments of the present technology. It is to be understood that battery 800 may include any aspect, component, characteristic, or feature of any battery discussed previously. The illustration may show an additional configuration for incorporating busbars along the battery to more uniformly draw and deliver current through the battery stack. The figure may illustrate a top view showing a circuit board 805, such as a first or second circuit board. Battery 800 may illustrate another encompassed incorporation of busbars 810, where the busbars are spaced further outward laterally, such as adjacent a second edge and third edge as previously described. The busbars may couple with outermost retaining members through the battery pack, which may further improve current distribution and uniformity through the battery pack. The busbars 810 may include central connectors that couple the individual busbars to a central distributor that may be coupled with a power distribution block, for example.

Figure 9:
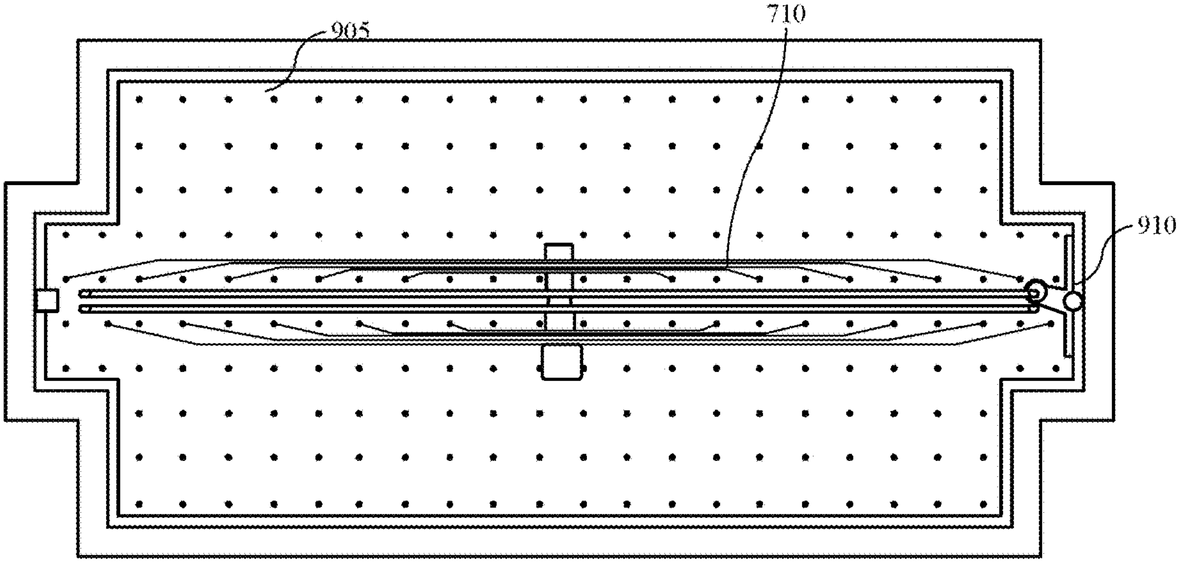
FIG. 9 shows a schematic top view of a battery according to some embodiments of the present technology.

FIG. 9 shows a schematic top view of a battery according to some embodiments of the present technology and may show a view of battery 700 with circuit board 705 removed. As illustrated, battery stack 905 may be seen along with busbars 710 extending across the battery stack. Batteries according to the present technology may include a number of additional components associated with the batteries, including high voltage components, which may be or include contactors, fuses, connectors, shunts, circuitry, and any other components associated with electrical delivery through the battery as well as coupling with a power distribution block 910 as previously described. Many conventional technologies may utilize batteries that include battery cells in set housing, such as boxed battery cells, and thus associated components for integrating the batteries or electrically coupling the batteries may be forced to be coupled at an exterior of the cells.

The present technology may include stacks of cells as previously described, which may facilitate cutouts or recesses to accommodate any number of configurations. For example, cutouts may be formed to accommodate aspects of a device in which the battery is incorporated, as well as to accommodate components associated with the battery. As shown in the figure, instead of electrical components being connected externally to an outer footprint of the battery stack, in some embodiments the components may be incorporated internally with cutouts in the battery stack. This may reduce an overall battery footprint for incorporation within a device or system. Because of the lateral dimensions of cells according to some embodiments of the present technology, cutouts can be made at any location to facilitate relevant placement of components.

Figure 10:
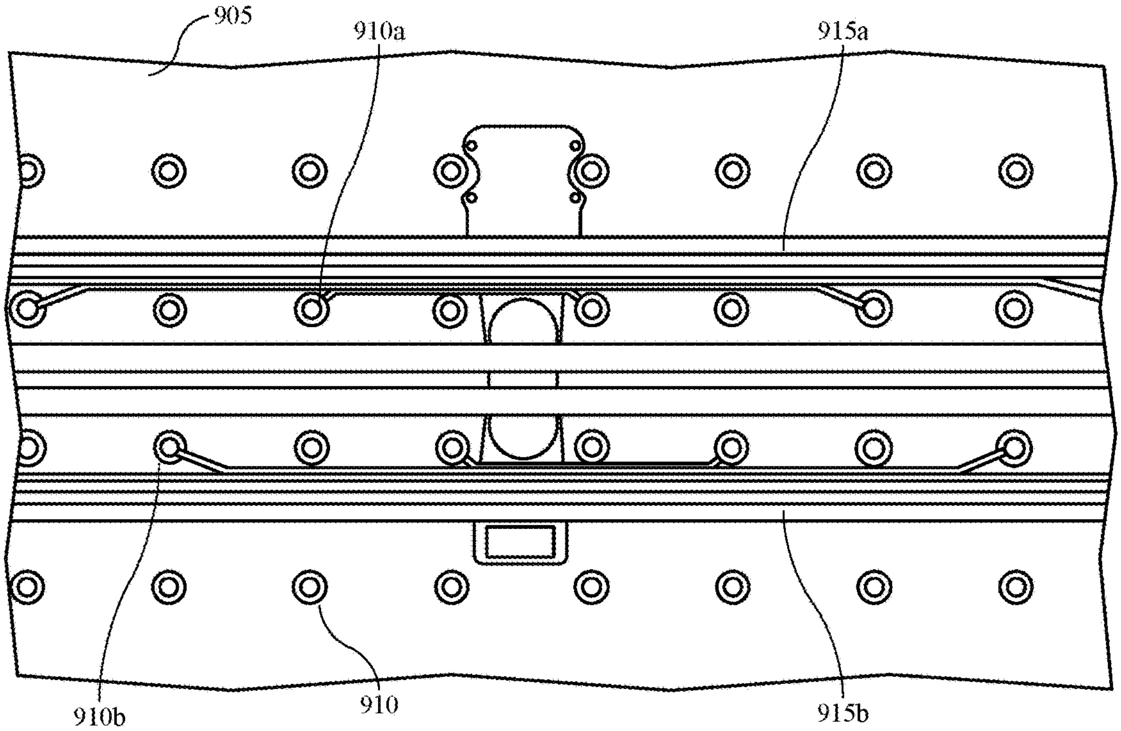
FIG. 10 shows a schematic detailed view of electronic components associated with batteries according to some embodiments of the present technology.

FIG. 10 shows a schematic detailed view of electronic components associated with batteries according to some embodiments of the present technology and may show a detailed view of battery stack 905. It is to be understood that the battery may include any component, feature, or characteristic of any other battery or component described previously. As shown, battery stack 905 may define a plurality of holes through the battery stack, which may have a number of fasteners 910 extending through the aperture for compressibly coupling the circuit boards with the battery stack. Across the battery stack, including overlying the circuit board as previously described, may be a number of busbars 915, which may electrically couple through the circuit board with the second surface of each circuit board for delivering current to or receiving current from the battery stack.

As shown, the busbars 915 may be conductive members extending across the battery and coupling with one or more fasteners 910, which may facilitate electrical coupling with the circuit boards as described below. The busbars 915 may then be electrically coupled with electrical components incorporated within recesses formed through the battery stack to provide central busing to and from the battery stack, which may then allow the current to be distributed from the battery. As noted above, busbars 915 may be grouped together in sets of busbars as illustrated and may be associated with fasteners having different configurations for coupling with the two circuit boards. For example, a first set of busbars 915*a* may be coupled with a first set of fasteners 910*a*, which may include features configured to conductively couple with the second surface of the first circuit board. Additionally, a second set of busbars 915*b* may be coupled with a second set of fasteners 910*b*, which may include features configured to conductively couple with the second surface of the second circuit board. Any number of additional sets of busbars and fasteners may be incorporated to further facilitate more uniform distribution of current from the battery stack. While fasteners 910*a* and fasteners 910*b*, all of which may be coupled with busbars, may include components for current delivery, other fasteners through the battery may not include the additional components, and may be simplified for compressive coupling, or may be utilized for cell monitoring and balancing operations.

Figure 11:
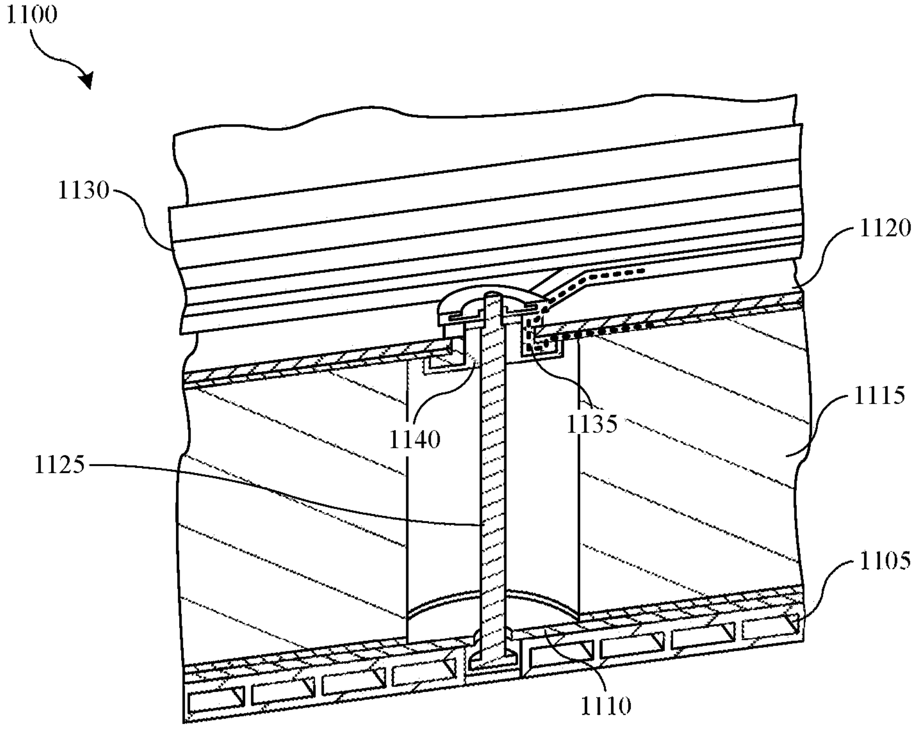
FIG. 11 shows a schematic view of a battery according to some embodiments of the present technology.

FIG. 11 shows a schematic partial view of a battery 1100 according to some embodiments of the present technology and may illustrate additional aspects of busing through the battery stack as previously described. Battery 1100 may include features of batteries as previously described, and may include any component, characteristic, or feature of any battery discussed elsewhere. For example, battery 1100 may include a base plate 1105, which may be seated in a housing, and may define channels for delivering a heat exchange fluid. A first circuit board 1110 may be seated overlying the base plate and may include any of the features of circuit boards previously described. For example, a second surface facing away from the base plate may include a conductive layer as described above. A battery stack 1115 may be seated overlying the first circuit board and may include a plurality of battery cells as described above. The battery stack 1115 may be electrically coupled with the second surface of the first circuit board. A second circuit board 1120 may be seated overlying the battery stack and may include a conductive layer on a second surface facing the battery stack. The battery stack may also be electrically coupled with the second surface of the second circuit board.

A plurality of retaining members 1125 may be included compressibly coupling the second circuit board with the first circuit board. Each retaining member may extend through a separate aperture defined through the battery stack. Additionally, busbars 1130 may be coupled with the battery for distributing current to and from the battery. As described above, the busbars 1130 may include a first set of busbars as illustrated, which may be coupled with a set of retaining members extending through the battery stack. These particular retaining members may include components forming electrical coupling with the second surface of the second circuit board as illustrated. For example, including a bolt or other coupling component extending from the second circuit board to the base plate, the retaining members 1125 may include a conductive coupler 1135 extending through and accessible through the second circuit board and coupled with the second surface of the second circuit board.

A gasket or insulator 1140 may extend about the conductive coupler, which may be seated within the insulator, to limit or prevent electrical coupling with other components of the system. For example, insulator 1140 may extend about an exterior surface of the conductive coupler and about the bolt of the retaining member 1125 to insulate the bolt from the conductive coupler. The insulator may additionally extend along an underside of the bolt head, which may limit or prevent contact between the busbar and the bolt. The busbar may extend to the retaining member and contact the conductive coupler in any number of ways. For example, the conductive coupler may include a ring at an end of the coupler, through which the insulator 1140 may extend to limit contact between the busbar and the bolt, while increasing contact circumferentially about the bolt with the conductive coupler, which may be an annular component extending about the bolt. The conductive couplers may be any different conductive material, and any other type of conductive couplings or traces may be extended between the busbar and the second surface of the circuit board to provide the electrical contact and are similarly understood to be encompassed by the present technology.

Figure 12:
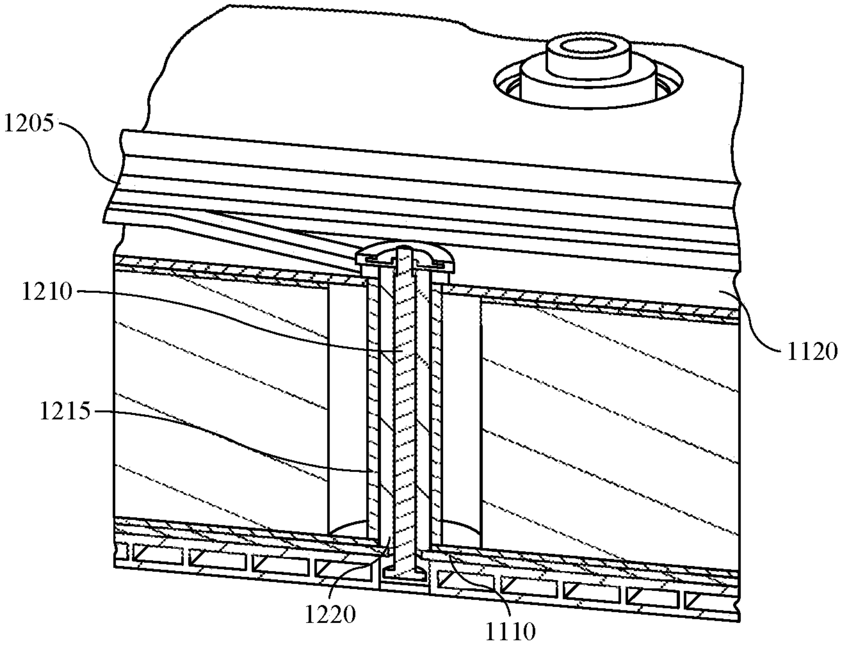
FIG. 12 shows a schematic view of a battery according to some embodiments of the present technology.

FIG. 12 shows a schematic partial view of battery 1100 according to some embodiments of the present technology and may illustrate a second set of busbars and retaining members for coupling with the second surface of first circuit board 1110. It is to be understood that the figure may illustrate a separate section of the battery as previously described. For example, in addition to the first set of busbars 1130, a second set of busbars 1205 may be included overlying the second circuit board, which may be coupled with a set of retaining members extending through the battery stack. These particular retaining members 1210 may include components forming electrical coupling with the second surface of the first circuit board 1110 as illustrated.

For example, including a bolt or other coupling component extending from the second circuit board to the base plate, the retaining members 1210 may include a conductive coupler 1215 extending through and accessible through the second circuit board 1120 and battery stack, and coupled with the second surface of the first circuit board. The conductive coupler may be a sleeve, which may be disposed about the bolt along with an insulator 1220 limiting or preventing contact between the conductive coupler 1215 and the bolt or other components. The busbars 1205 may be coupled with the conductive coupler 1215 as previously described, which may provide electrical coupling with the second surface of the first circuit board.

Figure 13:
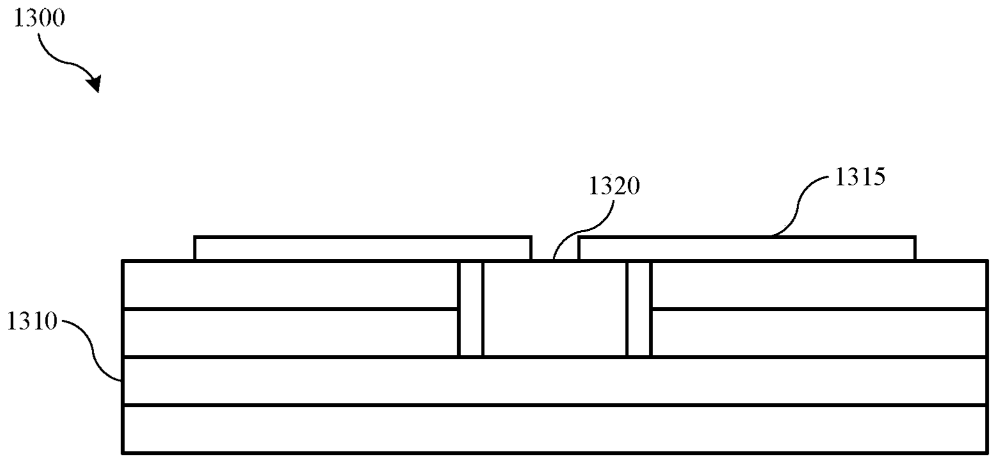
FIG. 13 shows a schematic cross-sectional view of a battery according to some embodiments of the present technology.

As discussed above, battery stacks according to some embodiments of the present technology may facilitate reducing the space for external components, by affording configurations in which recesses may be formed or cutouts may be produced through the battery stack. FIG. 13 shows a schematic cross-sectional view of a battery 1300 according to some embodiments of the present technology. For example, a battery stack 1310 may include a number of stacked battery cells as previously described. A set of busbars 1315 may extend across a top of the battery stack, such as above a circuit board as discussed above, for distributing current to and from the battery. As shown previously, such as with FIG. 10, electrical components may be associated with batteries of the present technology. Unlike conventional technology that may couple the electrical components externally to the battery stack, which may affect overall geometry, or increase an enclosure volume to accommodate the additional components, the present technology may seat components within the battery stack. As shown, one or more electrical components 1320, may be disposed within a recess formed within the battery stack 1310, and the busbars may be connected through the first circuit board with the components seated within the recesses formed into the battery stack. The electrical components may be contactors, high voltage components, or any other electrical component either discussed above, or that may be included with batteries to facilitate current distribution. Cutouts and recesses may also accommodate exterior aspects of a device or system in which the battery may be installed. By utilizing battery cells that may accommodate cutouts within an active area of the battery cells, any geometry or system may be accommodated by batteries according to embodiments of the present technology.

Figure 14:
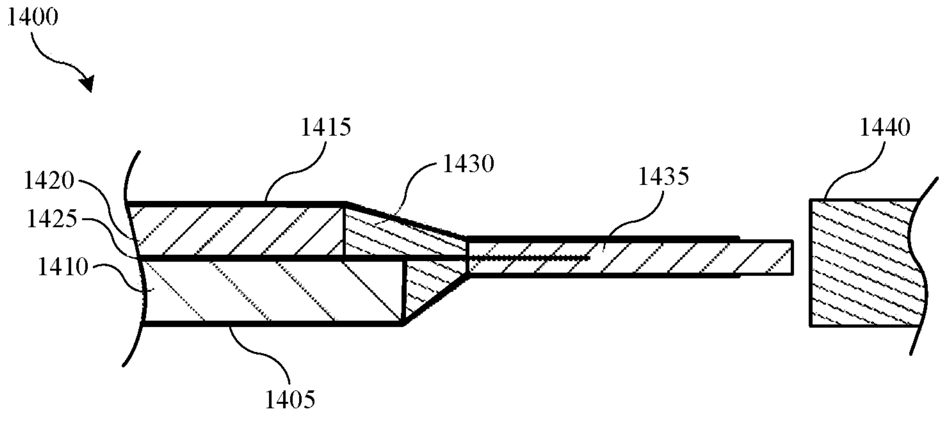
FIG. 14 shows a schematic cross-sectional view of a battery cell according to some embodiments of the present technology.

FIG. 14 shows a schematic partial cross-sectional view of a battery cell 1400 within a battery according to some embodiments of the present technology. Battery cell 1400 may include any of the components, features, or characteristics of any of the battery cells previously described and may illustrate additional details of the components described above, as may be incorporated within a battery or battery stack according to some or any embodiments of the present technology, including any battery previously described. For example, battery cell 1400 may illustrate an individual cell included within battery stacks described above, or any other stack noted previously, and which may include apertures for retaining members, or cutouts through the battery cells for recessing components as discussed above. It is to be understood that although not all components may be illustrated in this figure for ease of explanation, any of the previously noted battery components may be included in battery cell 1400.

As illustrated, and as previously described, battery cell 1400 may include an anode current collector 1405, which may be or include a polymeric material, and which may include an anode active material 1410 disposed on the anode current collector. The battery cell 1400 may include a cathode current collector 1415, which may be or include a polymeric material, and which may include a cathode active material 1420 disposed on the cathode current collector. A separator 1425 may be disposed between the anode active material and the cathode active material, and electrolyte 1430 may be included within the cell. At edge regions of the cell as previously described, and which may include either exterior edges of the battery cell or edges about a cutout for retaining members or other components, the cell may be sealed off, or include seals as previously described.

Additionally, a seal 1435 may be formed within the active region of the battery cells at each location where an aperture may be formed to receive a fastener 1440 extending through each cell of the battery stack, or which may provide a recess within the battery stack specifically sized to accommodate the exterior geometry of components to be seated within the recess. The seal may extend as an annulus about each aperture formed to ensure the cells may remain sealed to prevent leakage or shorting within the cell or may be formed to the specific exterior geometry of a component being accommodated. This may allow less active area material to be removed by creating the cutout to a specific tolerance about the component, which may limit a reduction in capacity. By utilizing batteries according to embodiments of the present technology, improved current distribution and packaging may be provided.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, nor both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery pack comprising:

a plurality of battery cells, each cell having a cathode terminal; and an upper board having a cathode busbar and a plurality of cathode metal traces each extending from the cathode busbar to each respective cathode terminal, wherein each cathode metal trace extends from a first edge of the upper board to make electrical contact at vias at a second edge of the upper board, wherein the first edge extends in a first direction and the second edge extends in a second direction different from the first direction, wherein the plurality of cathode metal traces are physically arranged in a sequence of increasing widths.

2. The battery pack of claim 1, wherein each cathode metal trace of the plurality of cathode metal traces has a different width.

3. The battery pack of claim 1, wherein the plurality of cathode metal traces are physically arranged in a sequence of decreasing width.

4. The battery pack of claim 1, wherein each battery cell of the plurality of battery cells further includes an anode terminal, and wherein the battery pack further comprises a lower board having an anode busbar and a plurality of anode metal traces each extending from the anode busbar to each respective anode terminal.

5. The battery pack of claim 4 wherein the plurality of anode metal traces are physically arranged in a sequence of increasing resistance.

6. The battery pack of claim 4, wherein each anode metal trace of the plurality of anode metal traces has a different width.

7. The battery pack of claim 4, wherein the plurality of anode metal traces are physically arranged in a sequence of decreasing width.

8. The battery pack of claim 4, wherein the upper board extends across a top surface of the plurality of battery cells and wherein the lower board extends across a bottom surface of the plurality of battery cells.

9. A battery comprising:

a row of batteries having an upper common surface opposite a lower common surface;

a first circuit board overlying the upper common surface and including a plurality of first metal conductors physically arranged in an order of increasing resistance and each electrically coupled a respective battery of the row of batteries, wherein each first metal conductor extends from a first edge of the first circuit board to a second edge of the first circuit board, wherein the first edge extends in a first direction and the second edge extends in a second direction different from the first direction; and a second circuit board overlying the lower common surface and including a plurality of second metal conductors physically arranged in an order of increasing widths resistance and each electrically coupled to a respective battery of the row of batteries.

10. The battery of claim 9, wherein the plurality of first metal conductors are physically arranged in order of decreasing width.

11. The battery of claim 9, wherein the plurality of second metal conductors are physically arranged in order of decreasing width.

12. The battery of claim 9, wherein the plurality of first metal conductors are electrically connected to a respective anode of each battery of the row of batteries.

13. The battery of claim 9, wherein the plurality of second metal conductors are electrically connected to a respective cathode of each battery of the row of batteries.

14. The battery of claim 9, wherein each battery of the row of batteries further includes a respective anode terminal and a respective cathode terminal, and wherein the first metal conductors are electrically coupled to a respective anode terminal of each battery of the row of batteries and wherein the second metal conductors are electrically coupled to a respective cathode terminal of each battery of the row of batteries.

15. The battery of claim 9, wherein a first edge of the first circuit board is characterized by a proximal end at which a second edge of the first circuit board intersects the first edge, wherein a first metal conductor of the plurality of first metal conductors that is formed adjacent the proximal end is characterized by a first impedance, and wherein a second metal conductor of the plurality of first metal conductors that is formed adjacent a distal end of the first edge of the first circuit board is characterized by a second resistance that is less than the first impedance.

16. The battery of claim 15, wherein the second metal conductor of the plurality of first metal conductors is characterized by a second width that is greater than a first width of the first metal conductor of the plurality of first metal conductors.

17. The battery of claim 15, wherein each successive metal conductor of the plurality of first metal conductors positioned along the first edge of the first circuit board is characterized by a decreasing length relative to a preceding metal conductor.

18. A battery comprising:

a first circuit board having a first surface and having a second surface opposite the first surface, wherein the second surface comprises a plurality of metal conductors extending laterally across the second surface and physically arranged in order of increasing width, wherein each metal conductor extends from a first edge of the first circuit board to a second edge of the first circuit board, wherein the first edge extends in a first direction and the second edge extends in a second direction different from the first direction;

a battery stack overlying the first circuit board and electrically coupled with the plurality of metal conductors, wherein the battery stack comprises a plurality of battery cells, and wherein the battery stack defines a plurality of apertures through an active region of the battery stack;

a second circuit board overlying the battery stack, wherein the second circuit board includes a front surface opposite a back surface, wherein the back surface comprises a conductive layer, and wherein the battery stack is electrically coupled to the back surface of the second circuit board;

a power distribution block electrically coupled to the first surface of the first circuit board along a first edge of the first circuit board, wherein the power distribution block is also electrically coupled to the second circuit board along a first edge of the second circuit board; and a plurality of retaining members coupling the second circuit board to the first circuit board.

19. The battery of claim 18, wherein each metal conductor of the plurality of metal conductors is coupled with at least two retaining members of the plurality of retaining members.

20. The battery of claim 19, wherein a first set of metal conductors of the plurality of metal conductors is electrically coupled with the second surface of the first circuit board via a first set of retaining members of the plurality of retaining members.

* * * * *